United States Patent [19]

Mori et al.

[11] Patent Number: 4,557,679
[45] Date of Patent: Dec. 10, 1985

[54] ROTARY FLUID MACHINE WITH THRUST BEARING MOUNTING UNIT

[75] Inventors: Hidetomo Mori; Osami Matsushita, both of Tomobe; Katsumi Matsubara, Usaiku; Michiaki Ida, Shimoinayoshi; Shigeru Sasaki, Tomobe, all of Japan

[73] Assignee: Hitachi, Ltd., Tokyo, Japan

[21] Appl. No.: 676,922

[22] Filed: Nov. 30, 1984

[30] Foreign Application Priority Data

Nov. 30, 1983 [JP] Japan .................. 58-224145

[51] Int. Cl.[4] .............................. F04C 18/24
[52] U.S. Cl. .................... 418/201; 384/542; 384/585
[58] Field of Search .............. 418/201-203; 384/542, 585

[56] References Cited

U.S. PATENT DOCUMENTS 3,388,854  6/1968  Olofsson .................. 418/97
3,900,232  8/1975  Rode ..................... 384/542
3,932,073  1/1976  Schibbye ................. 418/203

FOREIGN PATENT DOCUMENTS 333736    8/1930  United Kingdom .......... 384/585
712692    7/1954  United Kingdom .......... 308/189
1253964  11/1971  United Kingdom .......... 384/585

Primary Examiner—Leonard E. Smith
Assistant Examiner—Jane E. Obee
Attorney, Agent, or Firm—Antonelli, Terry & Wands

[57] ABSTRACT

A rotary fluid machine such as, for example, a screw compressor, a centrifugal compressor, or a pump, is provided with a thrust bearing mounting unit adapted to maintain natural frequencies of bending vibrations of rotors thereof within ranges of permissible values. The axial rigidity of the mounting unit is at least as high as that of the thrust bearings and the radial rigidity thereof is made to be not more than half that thereof. When a radial load is applied to the thrust bearings, the bearing mounting unit is deformed solely substantially in the radial direction and the thrust bearings bear substantially no radial load.

17 Claims, 15 Drawing Figures

ROTARY FLUID MACHINE WITH THRUST BEARING MOUNTING UNIT

BACKGROUND OF THE INVENTION

The present invention relates to a rotary fluid machine such as, for example, a screw compressor, a centrifugal compressor, or a pump, and, more particularly, to a rotary fluid machine which includes a rolling thrust bearing mounting means and which is suitable for use as a oil-free screw compressor in which a pair of screw rotors rotate in a meshed state.

During operation of a rotary fluid machine, a radial load and a thrust load act on the rotors thereof and, in order to support these loads, radial bearings and thrust bearings are provided on the trunnions of the rotors.

In, for example, U.S. Pat. Nos. 3,388,854 and 3,932,073, screw compressors are proposed wherein radial bearings and thrust bearings are provided for supporting radial and thrust loads, with the thrust bearings supporting a radial load in addition to the thrust load.

Preferably, in screw compressors, the thrust bearings support only the thrust load since, when the thrust bearings also support the radial load, the natural frequencies of the bending vibration of the rotors vary as compared to a screw compressor in which the thrust bearings do not support a radial load. Moreover, it is difficult to determine numeric values of the natural frequencies of the bending vibration of the rotors after they have thus changed. Consequently, the rotary fluid machine operates with unknown natural bending vibration frequencies of the rotor and it is dangerous to operate a rotary fluid machine in this condition since there is a very high possibility that resonance will occur. Since the resonance generates abnormal vibrations, the lifetime of the bearings is considerably reduced and eventually the vibrations destroy the thrust bearing mounting unit.

The aim underlying the present invention essentially resides in providing a rotary fluid machine such as, for example, a screw compressor, rotary compressor, pump or the like with a thrust bearing mounting unit in which thrust bearings for supporting a thrust load of the rotary body bear substantially no radial load thereof.

In accordance with advantageous features of the present invention, a rotary fluid machine is provided which includes a casing having a rotor-housing space and an inlet and outlet passage communicating with the space. At least one rotor is housed in the space and is rotatably supported on the casing by radial bearing means and thrust bearing means. A gas entering the space through the inlet passage passes the rotor and is then discharged through the outlet passage. Each thrust bearing means have inner races mounted securely onto a shaft portion of the rotor and outer races fixed to the casing by a bearing support unit, with the support unit having an axial rigidity at least as high as the thrust bearing means and a radial rigidity not more than half thereof so that the thrust bearing means bears substantially no radial load.

In accordance with further advantageous features of the present invention, the support unit has a bearing member provided with a flange and a plurality of studs with which the bearing member is fixed to the casing. The studs are provided between the casing and the flange of the bearing member and are separated by equal angular distances from one another. Each of the studs have an axially extending smaller-diameter portion which is formed such that the axial length thereof is greater than the thickness thereof.

In accordance with further advantageous features of the present invention, the support unit includes a bearing member provided with a flange and a fastener means by which the bearing member is fixed to the casing, with the bearing member having a plurality of columnar portions which extend axially from the flange so that the end portions thereof are in contact with end surfaces of outer races in the thrust bearing means. Each of the columnar portions are formed so that an axial length thereof is greater than a thickness thereof.

It is also possible in accordance with the present invention for the support unit to include a bearing member provided with a flange and a plurality of first columnar portions extending axially from the flange, with fastner means being provided for fixing the bearing member to the casing. A plurality of second columnar portions may extend axially from an oil feed ring, with the outer races in the thrust bearing means being positioned between the first columnar portions and the second columnar portions and being supported and held between the first and second columnar portions.

The support unit may, in accordance with the present invention, be provided with a housing holding the outer races of the thrust bearing means with the flange being attached to the housing. Advantageously, the housing may be attached to the columnar portions.

The studs may, for example, include a first screw portion, a smaller diameter portion attached to the first screw portion as well as a second screw portion, with the first screw portion being driven into the case. A nut means or the like may be provided for fixing the flange to the stud being threadably secured onto the second screw portion.

In accordance with further features of the present invention, the total number of columnar portions may be three in number.

In accordance with additional features of the present invention, a pair of rotors may be housed in the working space, with each of the rotors having a toothed portion and shaft portions. Roller radial bearing means may be provided between the shaft portions of the rotors and the casing to rotatably support the rotors. Roller thrust bearing means rotatably support the shaft portions of the rotor, and a bearing support unit may be provided between the roller thrust bearing means and the casing, with the bearing support unit having an axial rigidity at least as high as that of the roller thrust bearing means and a radial rigidity not more than half thereof.

The shaft portions of the rotors may be provided with timing gears which rotate the rotors in synchronism and a shaft sealing means may be provided between the roller bearing means on the shaft portions and the toothed portions of the rotors.

By virtue of the advantageous features of the present invention, the outer races of the rolling thrust bearings are fixed to a casing by a bearing mounting unit, with the bearing mounting unit being constructed so that an axial rigidity thereof is higher than that of the rolling thrust bearings, and the radial rigidity thereof is considerably lower by, for example, less than half, of the latter.

The radial rigidity of thrust bearings fixed to the casing by the bearing mounting unit can be determined by the following equation:

$$1/K = 1/K_B + 1/K_H,$$

where:
 $K_H = \frac{1}{3}K_B$,
 K is $\frac{1}{4}K_B$,
 $K_H = \frac{1}{4}K_B$, and
 $K = 1/5K_B$.

In the above equation, $K_B$ and $K_H$, respectively, represent the radial rigidity of the thrust bearings and the radial rigidity of the bearing mounting unit, with K representing the total rigidity. Consequently, in order to achieve the objects of the present invention, it is necessary for the radial rigidity of the bearing mounting unit to be no more than half that of the thrust bearings.

Accordingly, it is an object of the present invention to provide a rotary fluid machine with a thrust bearing mounting unit which is capable of maintaining the natural frequencies of bending vibration of the rotors within a predetermined range so as to prevent any dangerous operation of the machine.

Still another object of the present invention resides in providing a rotary fluid machine with a thrust bearing mounting unit capable of preventing the occurrence of abnormal vibrations, even when the rotors are vibrating and/or causing other components of the fluid machine to resonate.

A further object of the present invention resides in providing a rotary fluid machine with a thrust bearing mounting unit which extends the normal lifetime of the bearings.

These and other objects, features, and advantages of the present invention will become more apparent from the following description when taken in connection with the accompanying drawings which show, for the purpose of illustration only, several embodiments in accordance with the present invention.

DETAILED DESCRIPTION

Figure 1:
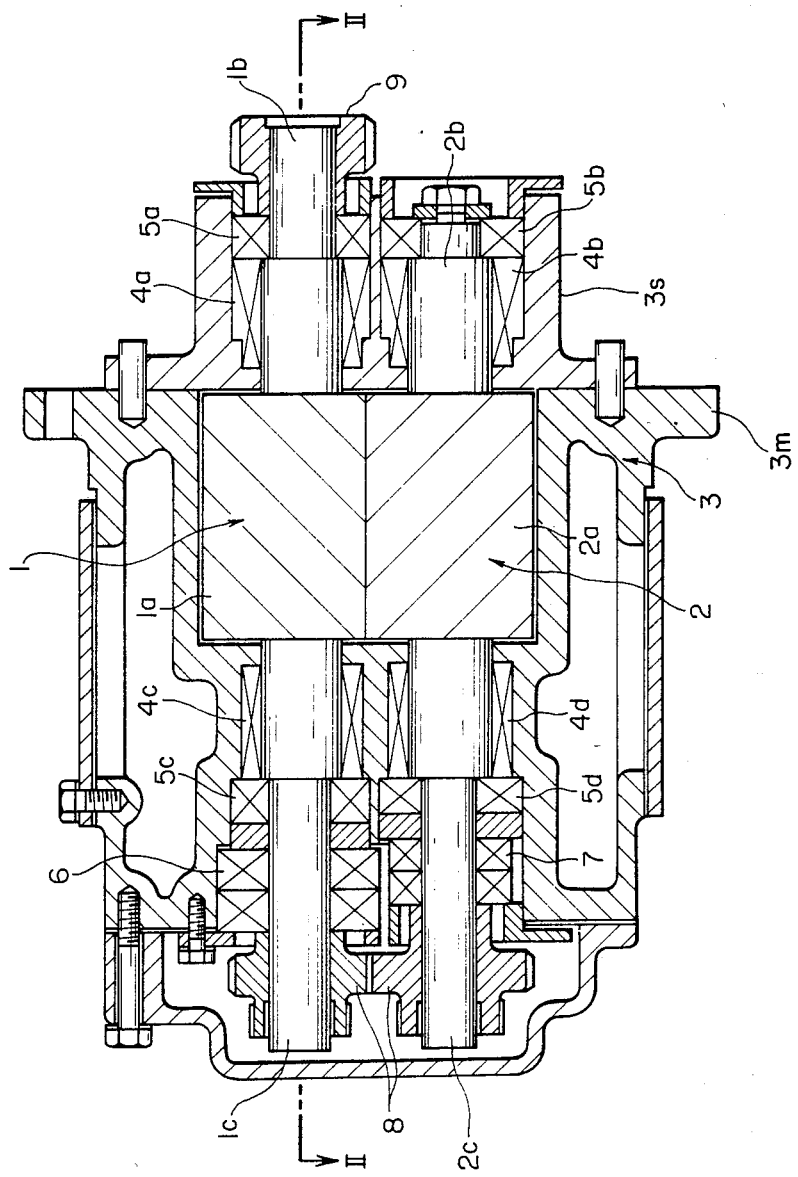
FIG. 1 is a cross sectional view of an oil free screw compressor taken along a plane including the axes of the pair of rotors thereof.
Figure 2:
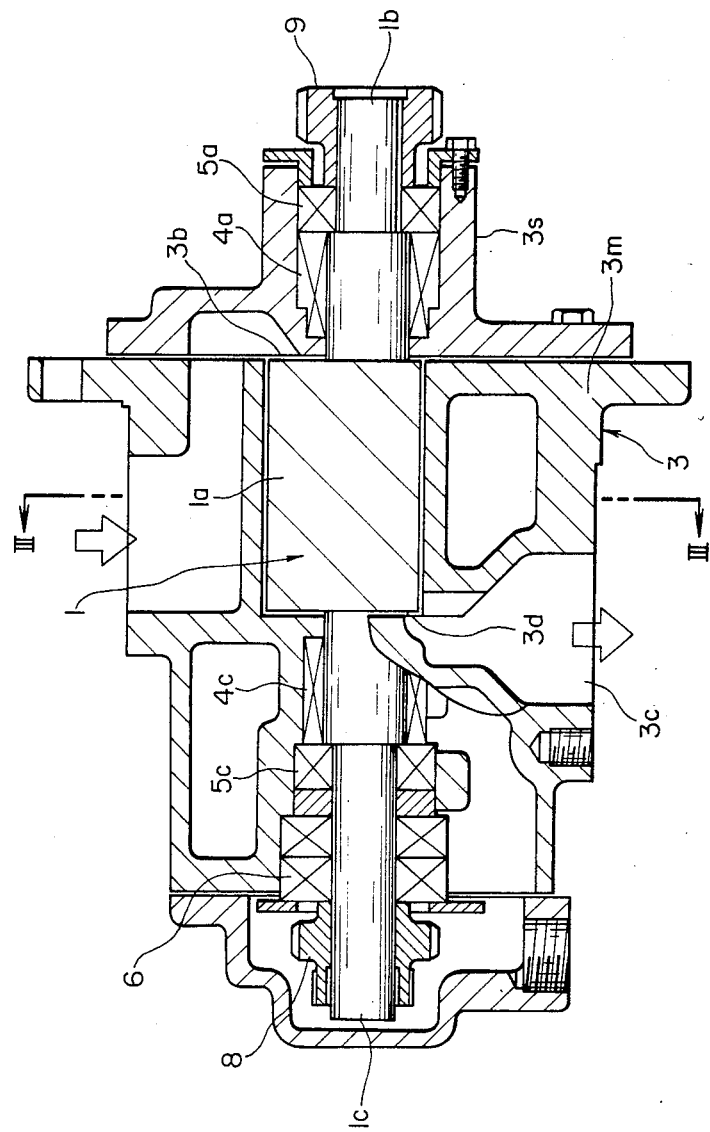
FIG. 2 is a cross-sectional view taken along the line II—II of FIG. 1.
Figure 3:
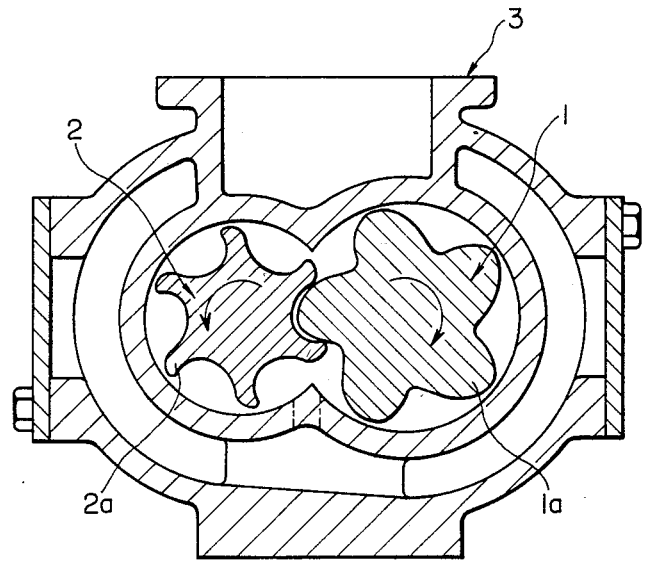
FIG. 3 is a cross sectional view taken along the line III—III of FIG. 2.

Referring now to the drawings wherein like reference numerals are used through the various views to designate like parts and, more particularly, to FIGS. 1-4, according to these figures, a male rotor generally designated by the reference numeral 1, including a toothed portion 1a and shaft portions 1b, 1c, and a female rotor generally designated by the reference numeral 2, including a toothed portion 2a and shaft portions 2b, 2c, mesh and are rotatably accommodated in a working space within a casing generally designated by the reference numeral 3. The casing 3 includes a main casing member 3m defining a working space and a suction casing member 3s attached to an end surface of the main casing member 3m. The shaft portions 1b, 1c of the male rotor 1 and the shaft portions 2b, 2c of the female rotor 2 extend through and project out of the casing 3, with the sections of the shaft portions which extend or pass through the walls of the casing 3 being provided with shaft seal members 4a, 4b, 4c, 4d, of the type disclosed, for example, in commonly assigned U.S. patent application Ser. No. 516,912. The shaft seal members 4a, 4b, 4c, are positioned close to the toothed portions 1a, 2a to seal a compressed gas such as, for example, compressed air thereby preventing the compressed gas from leaking into the working space and also to prevent bearing lubricating oil from entering the working space. Radial loaded ball bearings 5a, 5b, 5c, 5d and thrust loaded ball bearings 6, 7 are provided for rotatably supporting the male rotor 1 and female rotor 2 in the casing 3.

A pair of timing gears 8 are mounted on the shaft portions 1c, 2c of the male and female rotors 1, 2 so that the toothed portions 1a, 2a thereof can rotate in a contactless meshed state, with a pinion 9 being mounted on the shaft portion 1b of the male rotor 1 and meshing with a driving gear (not shown).

When the male rotor 1 is driven by the pinion 9 at, for example, between 15,000–24,000 rpm (50–120 m/sec), the rotors 1, 2 are synchronously rotated by the timing gears 8 with a narrow clearance being maintained between the rotors 1, 2 and, as a result of the rotation, a gas drawn onto the toothed portions 1a, 2a in the working space through a suction passage 3a and suction port 3b is compressed to, for example, 8 kg/cm$^2$G and is discharged from a discharge port 3b into a discharge passage 3c.

Figure 4:
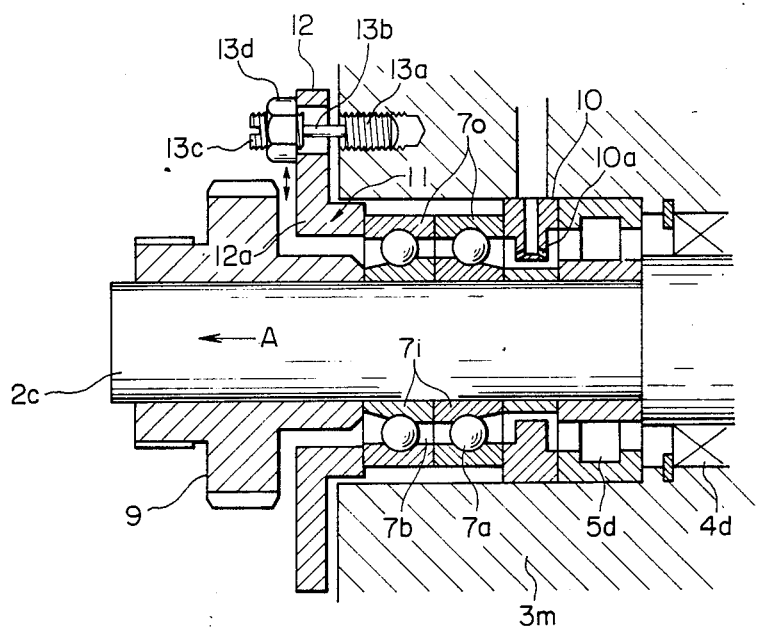
FIG. 4 is an enlarged detail cross sectional view of a thrust bearing for a compressor constructed in accordance with the present invention.

FIG. 4 provides an illustration of the details of a retainer unit for the thrust bearings 6 or 7. While only the details of the thrust bearing 7 is illustrated in the drawings, it is to be understood that the thrust bearing 6 has the same constructional features. In this connection, each of the thrust bearings 7 or 6 includes a pair of angular contact ball bearing members 7a, 7b which are provided between a ring 10 having an oil feed port 10a, and a mounting unit 11. Inner races 7i of the bearing members 7a, 7b are fixed to the shaft portions 2c or, in the case of the thrust bearing 6, to the shaft portion 1c of the female rotor 2 or male rotor 1. Outer races 70 are supported and held between the ring 10 and the mounting unit 11, with the mounting unit 11 including a holder 12 provided with a circular flange 12a and three equiangularly-spaced studs or stud bolts generally designated by the reference numeral 13 which are adapted to fix the holder 12 to the main casing member 3m so that the holder 12 can only move in the radial direction as shown by the double-headed arrow in FIG. 4. Each of the studs 13 includes a screw or thread portion 13a adapted to be inserted into the casing member 3m, a smaller diameter portion 13b, and a screw or threaded portion 13c onto which a nut 13d is threadably secured. An axial length of the smaller diameter portion 13b is greater than the thickness thereof, and the smaller diameter portion 13b is so formed that it bends when a radial force is applied to the free end of the stud 13. Each of the studs 13 has an axial rigidity equal to or greater than that of the thrust bearing 7 and a radial rigidity of at most half thereof.

When the thrust bearing 7 or 6 is mounted on the casing by the holder 12 and the studs 13, the holder is able to move in the radial direction because of the bending of the smaller diameter portion 13b of the studs 13, so that the thrust in the direction of the arrow a acting on the rotor 2 or 1 and the thrust bearing 7 or 6 is displaced in the radial direction so as to absorb this force and bear substantially no radial load.

Figure 5:
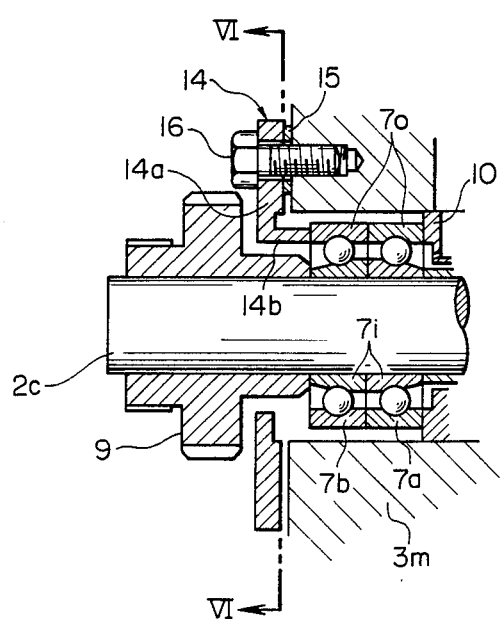
FIG. 5 is a cross-sectional view, on an enlarged scale, of another embodiment of a bearing for a compressor constructed in accordance with the present invention.
Figure 6:
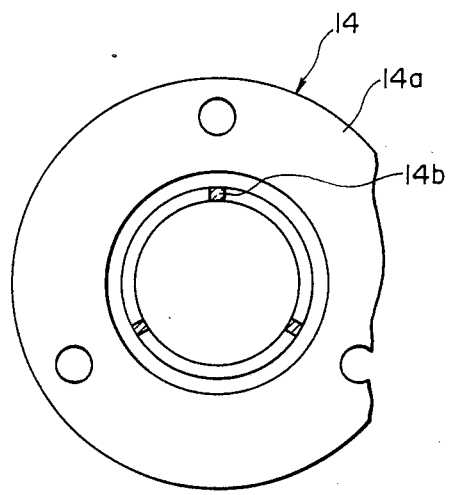
FIG. 6 is a cross-sectional view taken along the line VI—VI of FIG. 5.

In the embodiment of FIGS. 5 and 6, the portion which bends is formed as a holder generally designated by the reference numeral 14 which is adapted to be attached to the casing member 3m with fasteners such as, for example, bolts 16 or the like. The holder 14 includes a circular flange 14a and three columnar portions 14b extending axially outwardly from the flange 14a and being disposed at an equal angular distance with respect to each other. An axial cross-sectional area of each of the columnar portions 14b is several times that of the section therethrough at right angles to the axial cross section, and each columnar portion 14b has the same axial and radial rigidity characteristics as the smaller-diameter portion 13b of the stud bolts 13 so that the columnar portions 14b can bend in the radial direction.

The holder 14 is firmly attached to the casing member 3m through spacers 15 by the bolts 16, and the thrust bearing 7 or 6 is held between the columnar portions 14b and the ring 10. The spacers 15, of a suitable-selected thickness, are used to prevent the thrust bearing 7 or 6 from being squeezed too forcibly when the bolts 16 are tightened and to prevent the columnar portions 14b from buckling when the thrust bearings 7 or 6 are too forcibly squeezed.

In the embodiment of FIGS. 5 and 6, is the outer diameter of the thrust bearing 7 or 6 is 47 mm, the radial rigidity thereof is 6,000 kgf/mm, the radial rigidity of the mounting unit 11 is half that of the bearing 7 or 6, and the axial length of each of the columnar portions 14b is 8.5 mm, with the length of one side of each columnar portion 14b being 3.3 mm.

Figure 7:
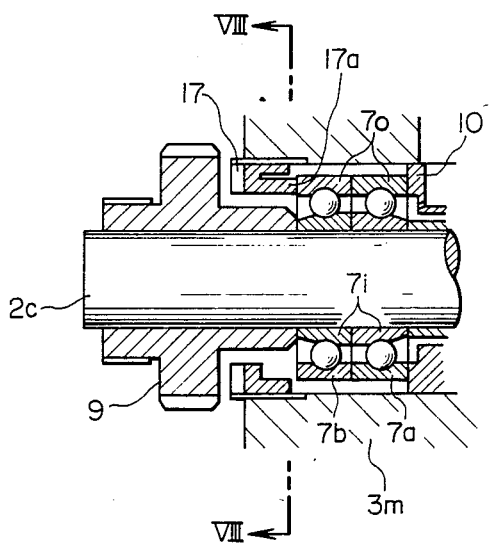
FIG. 7 is an enlarged cross-sectional detail view of another thrust bearing for a compressor constructed in accordance with the present invention.
Figure 8:
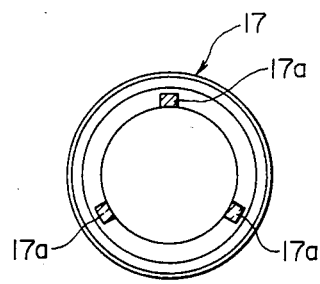
FIG. 8 is a cross-sectional view taken along the line VIII—VIII in FIG. 7.

In FIGS. 7 and 8, a holder generally designated by the reference numeral 17 is provided which is similar to the embodiment of FIGS. 5 and 6 and is adapted to be threadably secured to the casing member 3m. More particularly, as shown in FIGS. 7 and 8, the holder 17 is provided with columnar portions 17a, similar to the columnar portions 14b and a threaded portion around an outer circumference thereof. The holder 17 is adapted to be threadably inserted into a thread formed in the casing member 3m so that the thrust bearing 7 or 6 is held between the columnar portions 17a and the ring 10.

Figure 9:
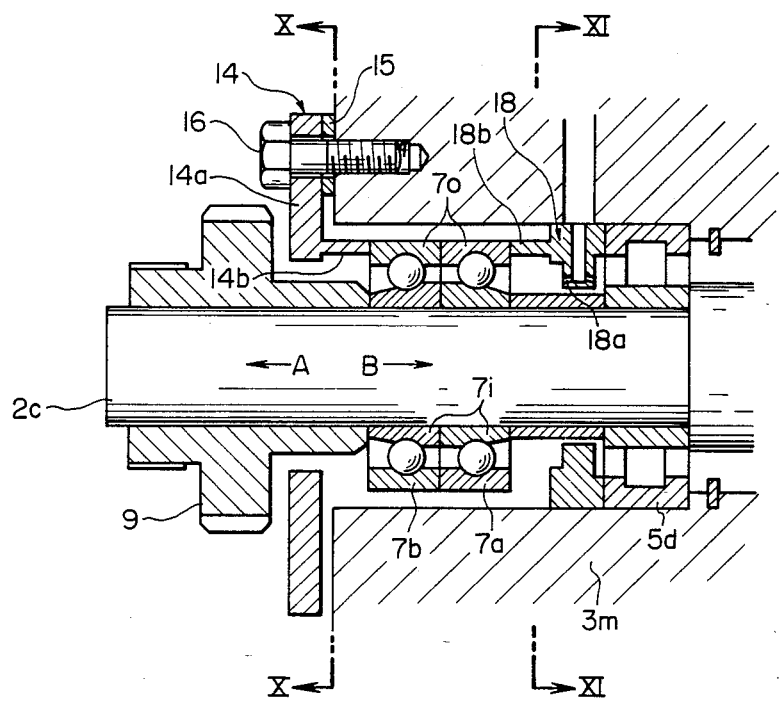
FIG. 9 is a cross-sectional view, on an enlarged scale, of a further embodiment of a bearing for a compressor constructed in accordance with the present invention.
Figure 10:
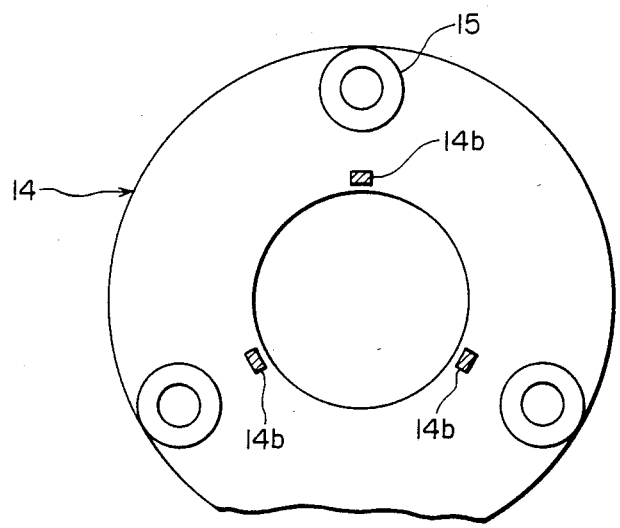
FIG. 10 is a cross-sectional view taken along the line X—X in FIG. 9.
Figure 11:
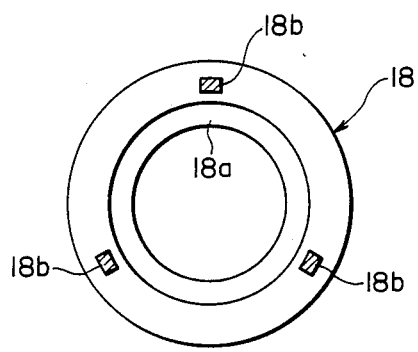
FIG. 11 is a cross-sectional view taken along the line XI—XI in FIG. 9.

The embodiment of FIGS. 9, 10 and 11 represents a modification of the embodiment of FIGS. 5 and 6 and, according to these figures, a mounting unit is provided having additional columnar portions, similar to those of the embodiment of FIGS. 5 and 6, on a side of the ring 10 for the bearing 7 or 6. More particularly, a ring generally designated by the reference numeral 18, having an oil feed port 18a, is provided with columnar portions 18b similar to the columnar portions 14b of the embodiment of FIGS. 5 and 6, with the bearing 7 or 6 being held between the columnar portions 18b, 14b. In all other respects, the construction of the embodiment of FIGS. 9–11 is identical to that of the corresponding parts of the embodiment of FIGS. 5, 6.

By virtue of a construction such as proposed in FIGS. 9–11, a bearing mounting unit can be obtained in which the thrust bearings 7 or 6 bear substantially no radial load when a thrust force is applied in either of the directions designated by the arrows A, B.

Figure 13:
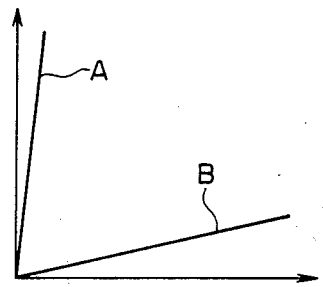
FIG. 13 is a graphical illustration of a relationship between a force applied to an annular piece and a deformation thereof.
Figure 12:
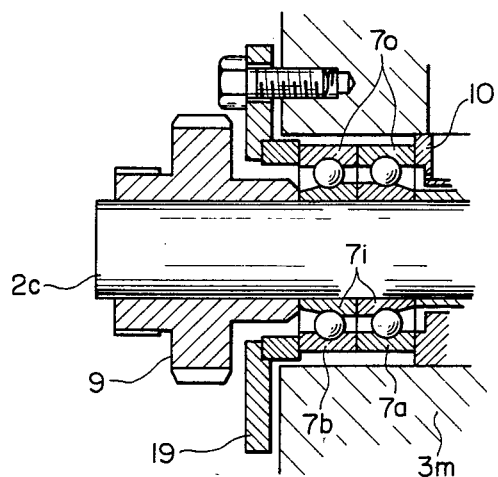
FIG. 12 is a cross-sectional view, on an enlarged scale, of a still further embodiment of a bearing for a compressor constructed in accordance with the present invention.

In the construction of FIG. 12, a bearing is held in place by a piece whose displacement has directional characteristics. More particularly, as shown in FIG. 12, an annular piece 19 having predetermined displacement directional characteristics, is interposed between a disc-shaped holder 19 and outer races 70 of the thrust bearing 7. The disc-shaped holder 19 is constructed in such a manner that a displacement thereof is small with respect to an axial force acting, for example, in the direction $A_1$ and large with respect to a radial force $B_1$ as shown in FIG. 13. Advantageously, the disc-shaped holder may be fashioned of an elastic material with axially-extending metal wires or the like embedded therein.

Figure 14:
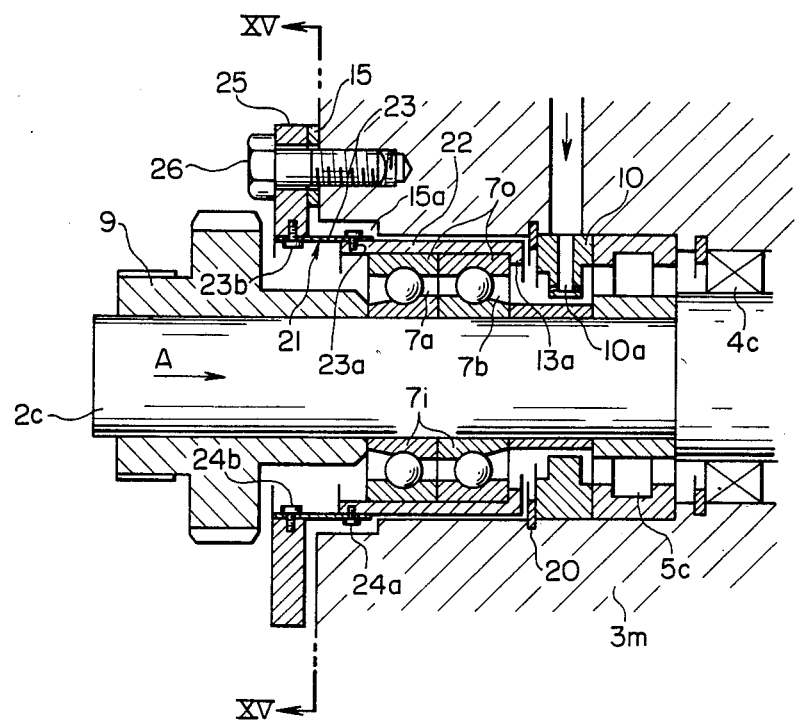
FIG. 14 is a cross-sectional view, on an enlarged scale, of yet another embodiment of a thrust bearing for a compressor constructed in accordance with the present invention.
Figure 15:
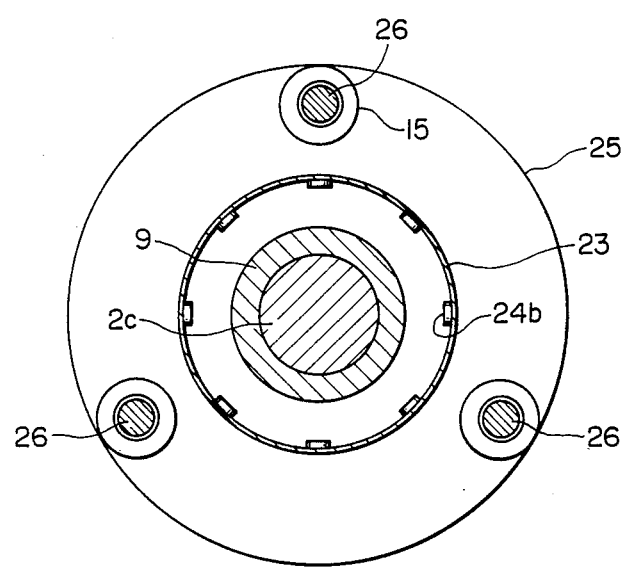
FIG. 15 is a cross sectional view taken along the line XV—XV in FIG. 14.

In the embodiment of FIGS. 14 and 15, a rolling thrust bearing 7 or 6 includes a pair of angular contact ball bearings 7a, 7b with the thrust bearing 7 or 6 being positioned close to the ring 10 provided with an oil feed bore 10a. The ring 10 and the radial bearing 5c are fixed in the casing member 3m by, for example, a snap ring 20. The inner races 7i of the bearing 7a, 7b are mounted securely on the shaft portion 2c or, in the case of the thrust bearing 7, the shaft portion 1c of the female rotor 2 and male rotor 1, with the outer races 70 being fixed to the casing member 3m by a bearing mounting unit generally designated by the reference numeral 21. The mounting unit 21 includes a housing 22 for holding the two outer races 70 together in such a manner that the outer race 70 can be manipulated as a single part. The mounting unit 21 also includes a flexible cylinder 23 fixed at one end 23a thereof to the housing 22 by a plurality of bolts 24a and a mounting plate 25 fixed to the other end 23b of the cylinder 23 by a plurality of bolts 24b, and to the casing member 3m over a spacer 15 by bolts 26. A right hand end of the housing 22 is provided with a collar 22a which defines a reference surface for the axial position of the inner race 7i held therein, and which acts as a stopper for an axial movement of the outer races 70. The outer races 70 are, of course, firmly fitted into the housing 22 so as not to move when the machine is in operation.

The cylinder 23 includes a thin cylindrical wall which is formed so that one end 23a thereof can be displaced in a radial direction but substantially not in an axial direction. Clearances are provided between the outer surface of the housing 22 and the inner surface of a portion of the casing member 3m which holds the bearing 7 or 6 and between an axial end surface of the housing 13 and that of a snap ring 11.

In the embodiment of FIGS. 14 and 15, the housing 22 holds the outer races of both of the thrust bearings 7a, 7b; however, it is also possible in accordance with the present invention to combine the characteristics of the embodiment of FIGS. 14 and 15 with the bearing mounting unit of the embodiments of FIGS. 1–4 or 5–6.

While, as indicated hereinabove, the embodiments described refer to mounting units for the rolling thrust bearings 7 which support the female rotor 2, the rolling thrust bearing 6 supporting the male rotor can also be mounted on the casing member using the mounting unit described hereinabove.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A rotary fluid machine comprising a casing means for defining a rotor-housing working space, a suction passage means and a discharge passage means communicating with said working space, a pair of rotors housed in said working space, each of said rotors having a toothed portion and shaft portion, roller radial bearing means provided between said shaft portions of said rotors and said casing means for rotatably supporting said rotors, roller thrust bearing means for rotatably supporting said shaft portions of said rotors, and a bearing support means provided between said roller thrust bearing means and said casing means, said bearing support means having an axial rigidity at least as high as an axial rigidity of said roller thrust bearing means and a radial rigidity of not more than one half that thereof.

2. A rotary fluid machine according to claim 1, wherein said shaft portions of said rotors are provided with timing gear means rotatable in synchronism with said rotors, and shaft sealing means provided between said roller bearing means and said shaft portions and said toothed portions of said rotors.

3. A rotary fluid machine according to claim 2, wherein said bearing support means includes a bearing holder means with a flange, a plurality of stud means for fixing said bearing holder means to said casing means, said stud means being positioned between said casing means and said flange of said bearing holder means at an equal angular distance from each other, each of said stud means includes an axially extending smaller-diameter portion formed such that an axial length thereof is greater than the thickness thereof.

4. A rotary fluid machine according to claim 3, wherein said support means includes a housing means for holding outer races of said thrust bearing means, and wherein said flange is attached to said housing means.

5. A rotary fluid machine according to claim 2, wherein said support means includes a bearing holder means provided with a flange, fastener means for securing said bearing holder means to said casing means, said bearing holder means includes a plurality of columnar portions extending axially from said flange so that end portions thereof are in contact with end surfaces of outer races of said thrust bearing means, and wherein each of said columnar portions is formed so that an axial length thereof is greater than a thickness thereof.

6. A rotary fluid machine according to claim 5, wherein said support means includes a housing means for holding outer races of said thrust bearing means, and wherein said housing means is attached to said columnar portions.

7. A rotary fluid machine according to claim 2, wherein said support means includes a bearing holder means provided with a flange, a plurality of first columnar portions extending axially from said flange, fastener means for fixing said bearing holder means to said casing means, a plurality of second columnar portions extending axially from an oil-feed ring, and wherein outer races of said thrust bearing means are positioned between said first columnar portions and said second columnar portions, said outer races being supported and held between said first and second columnar portions.

8. A rotary fluid machine according to claim 7, wherein at least three first columnar portions and at least three second columnar portions are provided.

9. A rotary fluid machine comprising: a casing means for defining a rotor-housing space, inlet and outlet passage means communicating with said space for respectively enabling a gas to enter said space and be discharged therefrom, at least one rotor means housed in said rotor-housing space, means for rotatably supporting said at least one rotor means in said casing including at least one radial bearing means and at least one thrust bearing means, said at least one thrust bearing means including inner race means securely mounted to a shaft portion of said at least one rotor means and an outer race means, and bearing support means for securely mounting said outer race means to said casing means, said support means having an axial rigidity at least equal to that of the thrust bearing means and a radial rigidity which is less than or equal to one half thereof whereby the at least one thrust bearing means bears substantially no radial load.

10. A rotary fluid machine according to claim 9, wherein said support means includes a bearing holder means provided with a flange, a plurality of first columnar portions extending axially from said flange, fastener means for fixing said bearing holder means to said casing means, and a plurality of second columnar portions extending axially from an oil feed ring, and wherein outer races of said thrust bearing means are positioned between said first columnar portions and said second columnar portions, and said outer races are supported and held between said first and second columnar portions.

11. A rotary fluid machine according to claim 10, wherein at least three first columnar portions and at least three second columnar portions are provided.

12. A rotary fluid machine according to claim 9, wherein said support means includes a bearing holder means provided with a flange, a plurality of stud means are provided on said bearing holder means for fixing the same to said casing means, said stud means being disposed between said casing means and said flange of said bearing holder means and being arranged at equiangular distances from one another, each of said stud means includes an axially extending smaller-diameter portion formed such that an axial length thereof is greater than a thickness thereof.

13. A rotary fluid machine according to claim 12, wherein said support means includes a housing means for holding the outer races of said thrust bearing means, and wherein said flange is attached to said housing means.

14. A rotary fluid machine according to claim 12, wherein each of said stud means includes a first threaded portion, a smaller-diameter portion attached to said first threaded portion, and a second threaded portion, said first threaded portion being driven into said casing, and a nut means for fixing said flange to said stud means, said nut means being threadably mounted on said second threaded portion.

15. A rotary fluid machine according to claim 9, wherein said support means includes a bearing holder means provided with a flange, fastener means for securing said bearing holder means to said casing means, said bearing holder means including a plurality of columnar portions axially extending from said flange so that end portions thereof contact end surfaces of outer races of said thrust bearing means, and wherein each of said columnar portions having an axial length greater than a thickness thereof.

16. A rotary fluid machine according to claim 15, wherein said support means includes a housing means for holding the outer races of the thrust bearing means, and wherein said housing means is attached to said columnar portions.

17. A rotary fluid machine according to claim 15, wherein at least three columnar portions are provided.

* * * * *